(12) United States Patent
Polishchuk

(10) Patent No.: US 9,891,773 B2
(45) Date of Patent: Feb. 13, 2018

(54) DETECTING HOVER DISTANCE WITH A CAPACITIVE SENSOR

(71) Applicant: SYNAPTICS INCORPORATED, San Jose, CA (US)

(72) Inventor: Igor Polishchuk, Fremont, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 115 days.

(21) Appl. No.: 14/972,189

(22) Filed: Dec. 17, 2015

(65) Prior Publication Data

US 2017/0177109 A1    Jun. 22, 2017

(51) Int. Cl.
*G06F 3/044* (2006.01)
*G06F 3/0354* (2013.01)

(52) U.S. Cl.
CPC .......... *G06F 3/044* (2013.01); *G06F 3/03545* (2013.01); *G06F 2203/04101* (2013.01)

(58) Field of Classification Search
CPC ................... G06F 3/044; G06F 3/0416; G06F 2203/04101
See application file for complete search history.

(56) References Cited

U.S. PATENT DOCUMENTS

| | | | |
|---|---|---|---|
| 7,567,240 B2 | 7/2009 | Peterson, Jr. et al. | |
| 8,054,300 B2 | 11/2011 | Bernstein | |
| 8,614,693 B2 | 12/2013 | King et al. | |
| 8,928,609 B2 | 1/2015 | Italia et al. | |
| 8,982,060 B2 | 3/2015 | King et al. | |
| 9,007,331 B2 | 4/2015 | Sobel et al. | |
| 9,019,226 B2 | 4/2015 | Karpin et al. | |
| 2009/0002580 A1* | 1/2009 | Matsushima | G02F 1/13338 349/12 |
| 2009/0058829 A1 | 3/2009 | Kim et al. | |
| 2010/0085325 A1* | 4/2010 | King-Smith | G06F 3/03545 345/174 |
| 2011/0007021 A1* | 1/2011 | Bernstein | G06F 3/0416 345/174 |
| 2011/0115746 A1 | 5/2011 | Wang et al. | |
| 2012/0043142 A1 | 2/2012 | Grivna | |
| 2012/0188202 A1* | 7/2012 | Tsujino | G06F 3/0412 345/174 |
| 2013/0106777 A1 | 5/2013 | Yilmaz et al. | |

(Continued)

*Primary Examiner* — Nelson Rosario
*Assistant Examiner* — Chun-Nan Lin
(74) *Attorney, Agent, or Firm* — Patterson + Sheridan, LLP

(57) ABSTRACT

Techniques for estimating height of an input object in a sensing region of an input device are provided. The techniques include constructing a signal profile based on measured data. The techniques also include determining a fit value of a fitting parameter of a mathematical function that fits the mathematical function to the signal profile such that the fitting of the mathematical exceeds a quality threshold. The fitting parameter correlates to hover height of the input object and adjusting the fitting parameter affects the fit of the mathematical function to the signal profile. In some embodiments, fitting a curve includes varying the height parameter of a mathematical function until the curve generated by the mathematical function with the selected height parameter is deemed to fit obtained sensor data to within a certain tolerance. In other embodiments, fitting a curve may be accomplished with direct computation.

20 Claims, 8 Drawing Sheets

(56) References Cited

U.S. PATENT DOCUMENTS

2014/0092069 A1 4/2014 Bentov
2014/0267130 A1 9/2014 Hwang et al.
2015/0234509 A1* 8/2015 Guard .................. G06F 3/0412
345/174

* cited by examiner

DETECTING HOVER DISTANCE WITH A CAPACITIVE SENSOR

BACKGROUND

Field of the Disclosure

Embodiments generally relate to input sensing and, in particular, to detecting hover distance with a capacitive sensor.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

One difficulty with input devices is with the ability to detect the hover height of an input object proximate to an input device. Reliable techniques for accurate determination of hover height generally do not exist. Hover detection and hover height determination would add additional utility to proximity sensor devices.

SUMMARY

In one embodiment, a processing system is provided. The processing system includes a sensor processor, configured to acquire changes of capacitance in a sensing region associated with a plurality of sensor electrodes in a capacitive sensor, wherein at least some of the changes of capacitance are due to an input object being present in the sensing region. The processing system also includes a data processor that is configured to determine a signal profile based on the changes of capacitance, determine a fit value of a fitting parameter of a mathematical function that fits the mathematical function to the signal profile, the fitting of the mathematical function to the signal profile exceeding a quality threshold, wherein the fitting parameter correlates to hover height of an input object and adjusting the fitting parameter affects the fit of the mathematical function to the signal profile, calculate a hover height based on the fit value of the fitted mathematical function, and output the hover height.

In another embodiment, a method is provided. The method includes acquiring changes of capacitance in a sensing region associated with a plurality of sensor electrodes in a capacitive sensor, wherein at least some of the changes of capacitance are due to an input object being present in the sensing region. The method also includes determining a signal profile based on the changes of capacitance. The method further includes determining a fit value of a fitting parameter of a mathematical function that fits the mathematical function to the signal profile, the fitting of the mathematical function to the signal profile exceeding a quality threshold, wherein the fitting parameter correlates to hover height of an input object and adjusting the fitting parameter affects the fit of the mathematical function to the signal profile. The method also includes calculating a hover height based on the fit value of the fitted mathematical function. The method further includes outputting the hover height.

In a further embodiment, an input device is provided. The input device includes a plurality of sensor electrodes within a sensing region. The input device also includes a processing system that is configured to acquire changes of capacitance in the sensing region, wherein at least some of the changes of capacitance are due to an input object being present in the sensing region, determine a signal profile based on the changes of capacitance, determine a fit value of a fitting parameter of a mathematical function that fits the mathematical function to the signal profile, the fitting of the mathematical function to the signal profile exceeding a quality threshold, wherein the fitting parameter correlates to hover height of an input object and adjusting the fitting parameter affects the fit of the mathematical function to the signal profile, calculate a hover height based on the fit value of the fitted mathematical function, and output the hover height.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for estimating a hover height of an input object. The techniques include constructing a signal profile based on measured data and fitting a curve to the signal profile, the curve being generated based on an estimated height parameter and on sensor electrode positions. In some embodiments, fitting a curve includes varying the height parameter of a mathematical function until the curve generated by the mathematical function with the selected height parameter is deemed to fit obtained sensor data to within a certain tolerance. In other embodiments, fitting a curve may be accomplished with direct computation.

Figure 1:
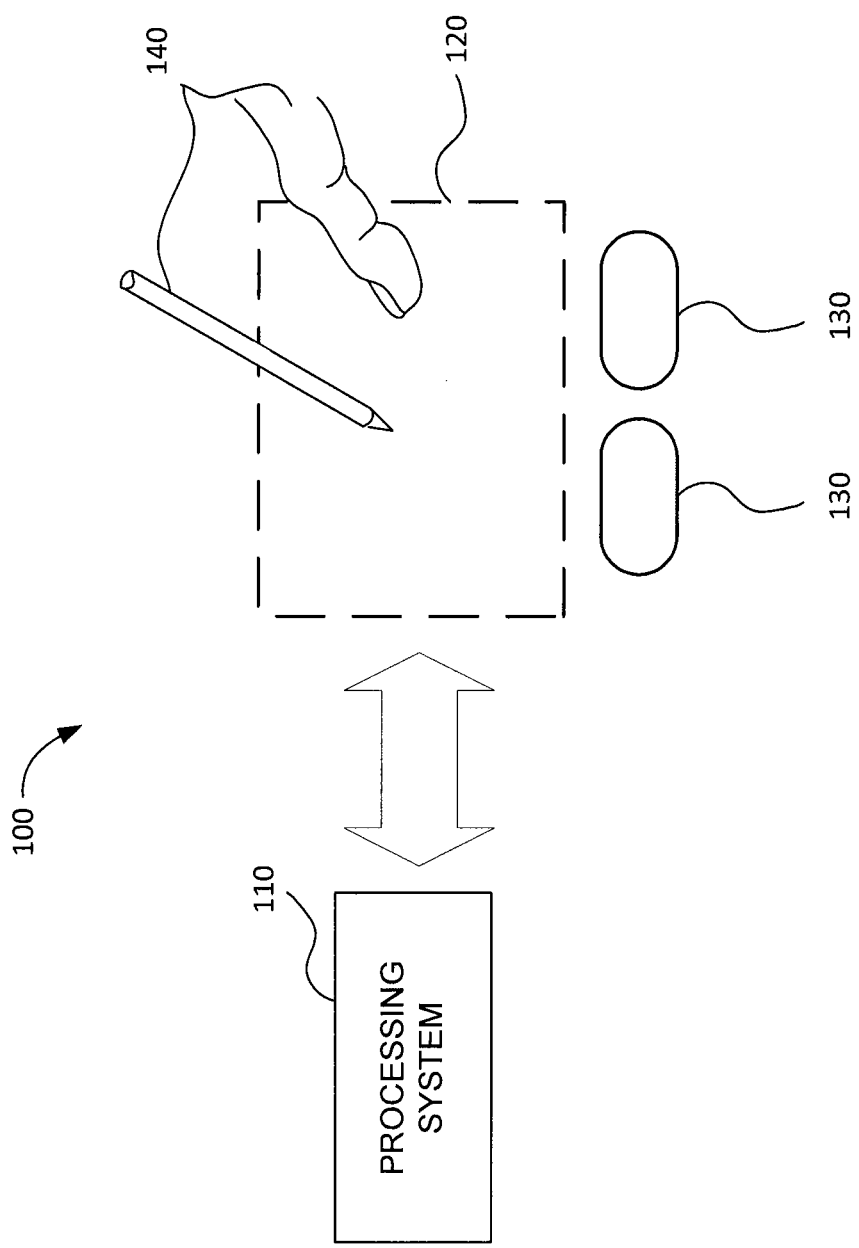
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SRI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interlace for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
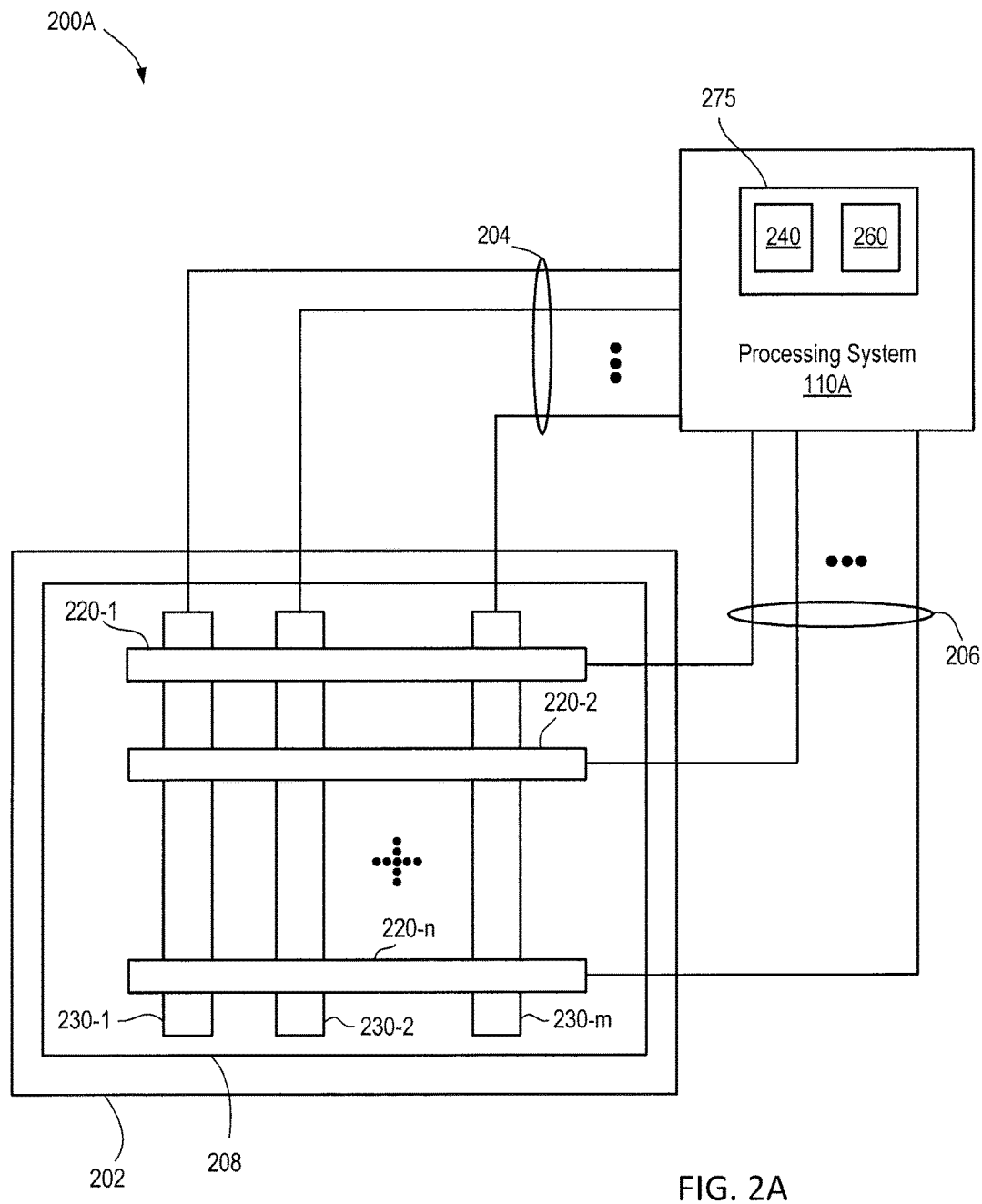
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be transmitter electrodes and sensor electrodes 230 may be receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
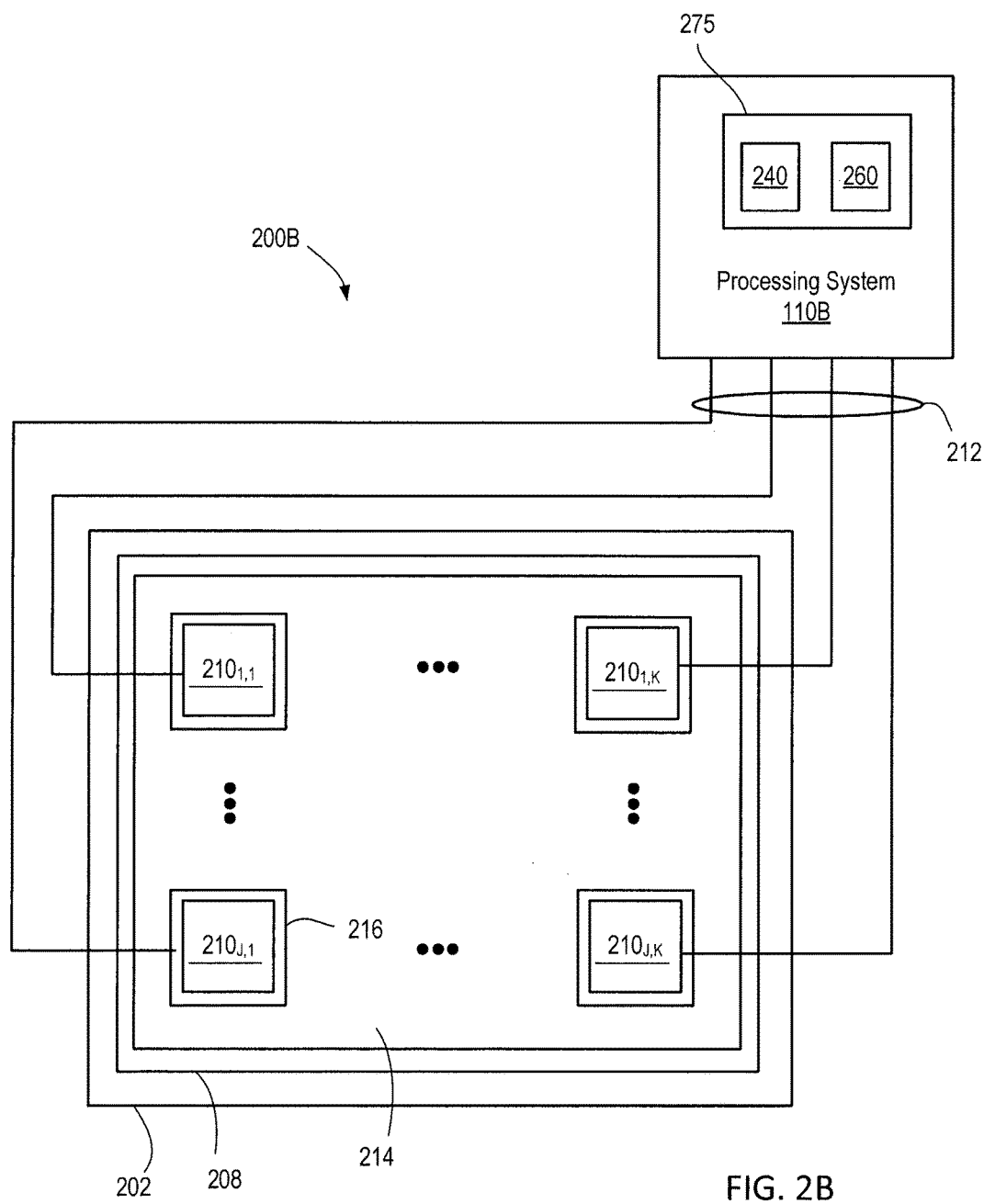
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110B can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110B by conductive routing traces 212. The processing system 110B can also be coupled to the grid electrode 214 through one or more routing traces (not shown for clarity). The processing system 110B is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110 (e.g., processing system 110A or processing system 110B) excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor module 240 and a determination module 260. The sensor module 240 and the determination module 260 comprise modules that perform different functions of the processing system 110. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal(s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensor electrode collection 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). In another example, the system ground may be the common voltage of the display electrodes (i.e., "VCOM"). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

In FIGS. 2A and 2B, a portion of the processing system 110 referred to as a "sensor processor" may drive sensor electrodes for sensing and receive resulting signals, and a portion of the processing system 110 referred to as a "data processor" may perform operations for processing the received signals and determining a position of an input object 140, as well as other operations, such as estimating height, which are described below.

Estimating Height Based on Signal Profile

Signals received from sensor electrodes (e.g., sensor electrodes 210, sensor electrodes 220, and sensor electrodes 230) can be used to estimate height of an input object 140, where "height" refers to the vertical distance (i.e., distance in a direction perpendicular to the touch surface) of an input object 140 from the touch surface. More specifically, to estimate height, processing system 110 obtains measurements from a plurality of sensor electrodes. The processing system 110 generates a signal profile from the measurements and obtains a height parameter from the signal profile. The processing system 110 obtains the height parameter via a mathematical function that correlates input object height to other aspects of the input device 100. In some embodiments, the mathematical function outputs fitting curves that are based on a height parameter. In such embodiments, obtaining the input object height comprises determining what height parameter produces a curve that fits the signal profile to within a particular quality threshold. Additional details are described herein.

Figure 3A:
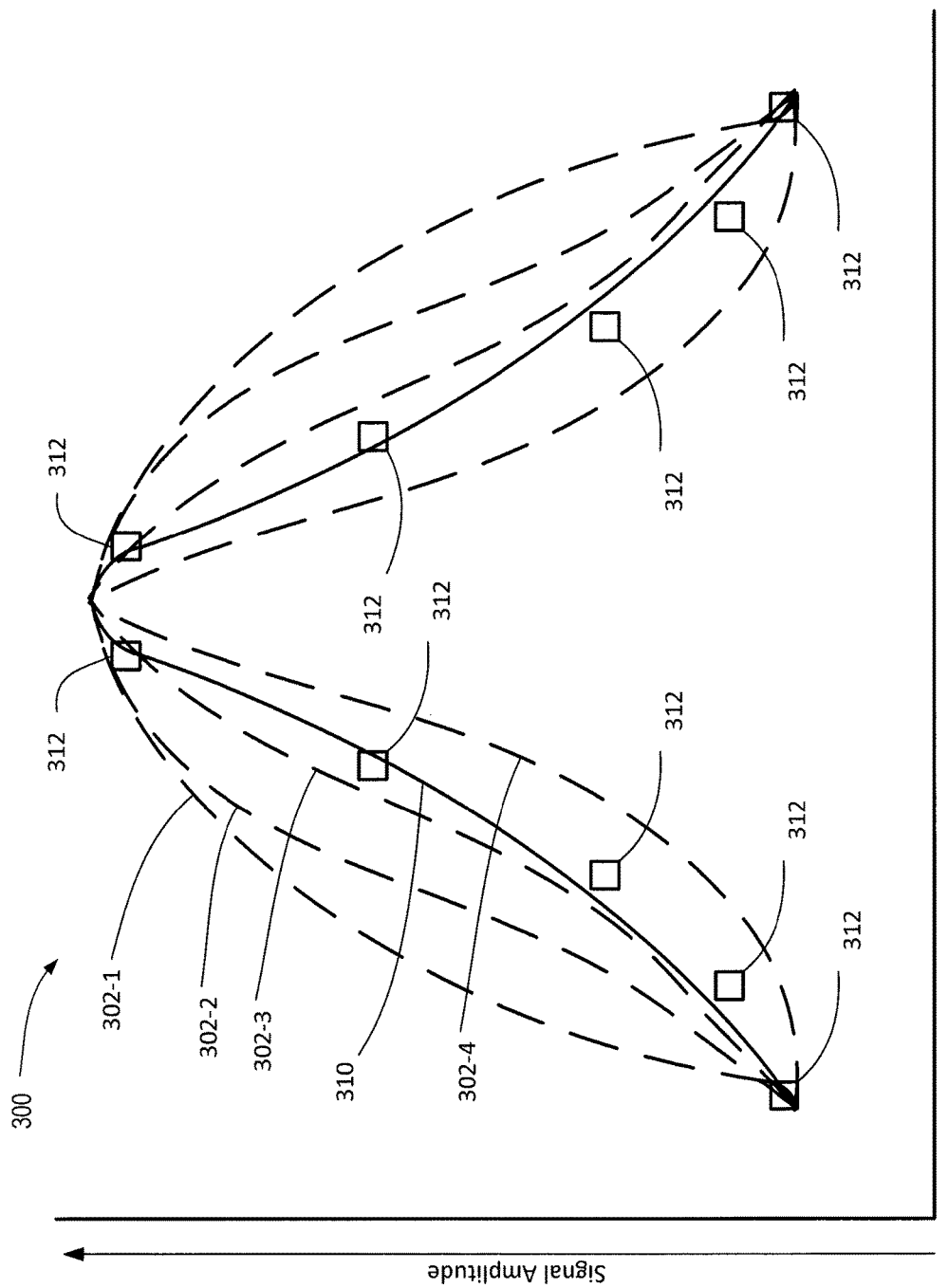
FIG. 3A is a graph that illustrates a signal profile and fitting curves for determining height of an input object, according to an example.

FIG. 3A is a graph 300 that illustrates a signal profile 310 and fitting curves 302 for determining height of an input object, according to an example. The x-axis of the graph 300 represents sensor electrode position and the y-axis of the graph 300 represents signal amplitude.

Processing system 110 derives the signal profile 310 from measurements 312 that are based on signals received with sensor electrodes. The measurements 312 represent amplitudes of processed (e.g., filtered, or processed in other ways) signals received with sensor electrodes at the sensor electrode position corresponding to the matching location on graph 300.

In addition to the signal profile 310, various fitting curves 302 are shown. The fitting curves 302 represent curves generated by applying a particular height parameter to a mathematical function that correlates amplitude with height of an input object. Several fitting curves 302 are shown to illustrate that one particular fitting curve 302 "fits" the signal profile 310 better than others. While four fitting curves 302 are shown in FIG. 3A, any number of potential fitting curves may be evaluated to find a fitting curve that matches the signal profile 310. Specifically, the fitting curve 302-3 fits the signal profile 310 better than the other fitting curves 302 in this example. Thus, processing system 110 would determine that the height associated with the fitting curve 302-3 is the height for the input object that generated the data associated with the signal profile 310.

While any mathematical function that correlates height to signal amplitude and location may be used to generate the fitting curves 302, several example mathematical functions are now provided. A first example mathematical function is one based on the ArcTan function, as follows:

$$P(y) = \tan^{-1}\left(\frac{ah}{y^2 + h^2 - \left(\frac{a}{2}\right)^2}\right)$$

In this mathematical function, a is the width of the sensor electrode, y is the position of the sensor electrode, and h is the height of the input object. Another example mathematical function is a Cauchy function and is as follows:

$$P(y) = \frac{1}{1 + \left(\frac{y}{h}\right)^2}$$

The values y and h are the same as with the first example equation. Yet another example mathematical function is a Gaussian profile, and is as follows:

$$p(y) = e^{(-y^2/2h^2)}$$

The values y and h are the same as with the first and second example equations and the value e is the well-known mathematical constant. Note that position is shown in FIG. 3A in only a single dimension. Because arrays of sensor electrodes are generally two-dimensional, the dimension associated with the graph 300 in FIG. 3A may be any single direction within the array. In some embodiments, the dimension may be aligned with rows or columns of rectangularly arrayed sensor electrodes.

In some embodiments, to obtain a height, processing system 110 varies the height parameter h until the curve produced by the selected function (e.g., one of the ArcTan function, the Cauchy function, or the Gaussian profile function, or another function) fits the measured data to within a particular tolerance. In some embodiments, least-squares criteria may be used to determine how well the curve produced by the selected function fits the measured data. When the result from the least-squares criteria is within the particular tolerance, processing system 110 deems the curve generated by the selected function and a selected height parameter to "match" the measurement data. Processing system 110 deems the selected height to be the height of the input object that produced the measurement data.

In other embodiments, a direct calculation method may be used to determine the height parameter. The form of Gaussian profile provided above is well-known. Known techniques exist for fitting data to a Gaussian profile via direct computation, and for determining a parameter of the Gaussian profile that is analogous to the h parameter above, through direct computation. Processing system 110 could use those techniques to obtain the h parameter, and thus a height for an input object 140, based on input data. More specifically, specific equations exist for calculating the h parameter for a best fit Gaussian profile based on measurement data.

Note that the fitting curves 302 shown in FIG. 3A are normalized according to some embodiments. What this means is that the curves are scaled such that the maxima of each different curve is equal. Normalization is used due to the fact that fitting curves for larger height values will have lower maxima than fitting curves for lower height values, since signal amplitudes are lower when the input object is further away from the sensor electrodes. The normalized fitting curves 302 are compared to the signal profile 310 in order to better find a fitting curve 302 that matches the signal profile 310.

The differentiation in shape between fitting curves 302 for different input object heights exists because amplitude is related to distance to sensor electrode and because the distance from an input object to neighboring electrodes differs to a smaller degree when an input object is at a greater height than when an input object is at a smaller height.

Figure 3B:
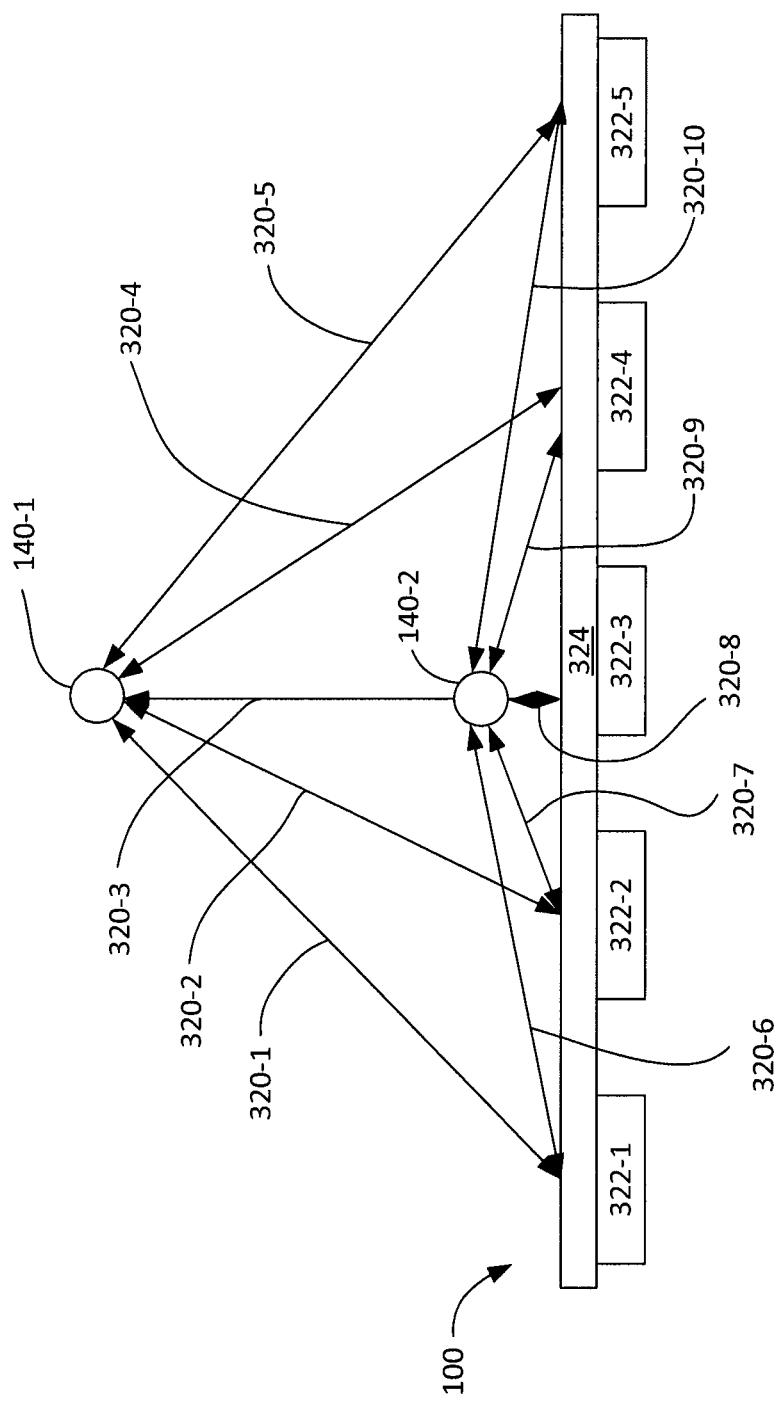
FIG. 3B is a schematic diagram illustrating the manner in which amplitudes of received signals vary based on input object height, according to an example.

FIG. 3B is a schematic diagram illustrating the manner in which amplitudes of received signals vary based on input object height, according to an example. As shown, FIG. 3B illustrates an input device 100 having several sensor electrodes 322, a cover surface 324, and input objects 140. FIG. 3B also includes distance indicators 320 to illustrate the distance between input objects 140 and sensor electrodes 322. Note that sensor electrodes 322 may comprise, for example, sensor electrodes 210, sensor electrodes 220, or sensor electrodes 230.

Input objects 140 are illustrated in two different positions in FIG. 3B. A first input object 140-1 is illustrated at a position that has a greater height than the height of a second input object 140-2. Due to the closeness of the second input object 140-2 to the input device 100, the closest sensor electrode 322-3 is much closer to the second input object 140-2 than other sensor electrodes, such as sensor electrode 322-2 and sensor electrode 322-1. Because of this difference in distance, the signal profile for the second input object 140-2 would have a "narrow" shape (similar, for example, to fitting curve 302-4 of FIG. 3A) compared to signal profiles for objects having a greater height than that of the second input object 140-2. For the first input object, which is much farther away from the input device 100, the difference between the closest distance 320-3 and farther distances such as distance 320-2 and 320-1 is less pronounced. Because of these less pronounced differences in distance, the signal profile for the first input object 140-1 would have a more rounded shape (similar, for example, to fitting curve 302-1 of FIG. 3A) compared to the signal profile for an object that is has a smaller height than that of the first input object 140-1.

Note that because the first input object 140-1 is farther from the input device 100 than the second object 140-2, the amplitudes of the measurements for the first input object 140-1 would be substantially smaller than those for the second input object 140-2. Thus, un-normalized profiles for the two input objects 140 would not have the same maximum measurement. Normalization causes the maximum measurement for different input objects 140 to be substantially the same despite being at different heights. In some embodiments, normalization can be performed by dividing every measurement obtained by the maximum measurement value, so that the maximum value in each curve is approximately 1. The fitting curves 302 and the signal profile 310 of FIG. 3A are normalized.

Referring momentarily back to FIG. 3A, note that the signal profile 310 is illustrated as a continuous line for illustrative purposes only. The data that actually comprises the signal profile 310, which are the measurements 312, are discrete values. Note also that while a 2-dimensional graph is depicted in FIG. 3A, which would imply only a single position dimension (corresponding to the x-axis in FIG. 3A), in reality, sensor electrodes are arrayed to provide measurements in more than a single position dimension. The specific number and configuration of measurements, as well as the manner in which those measurements are manipulated to obtain signal profiles, depends on what type of sensing is performed. Several examples of different types of sensing are now described.

Figure 4A:
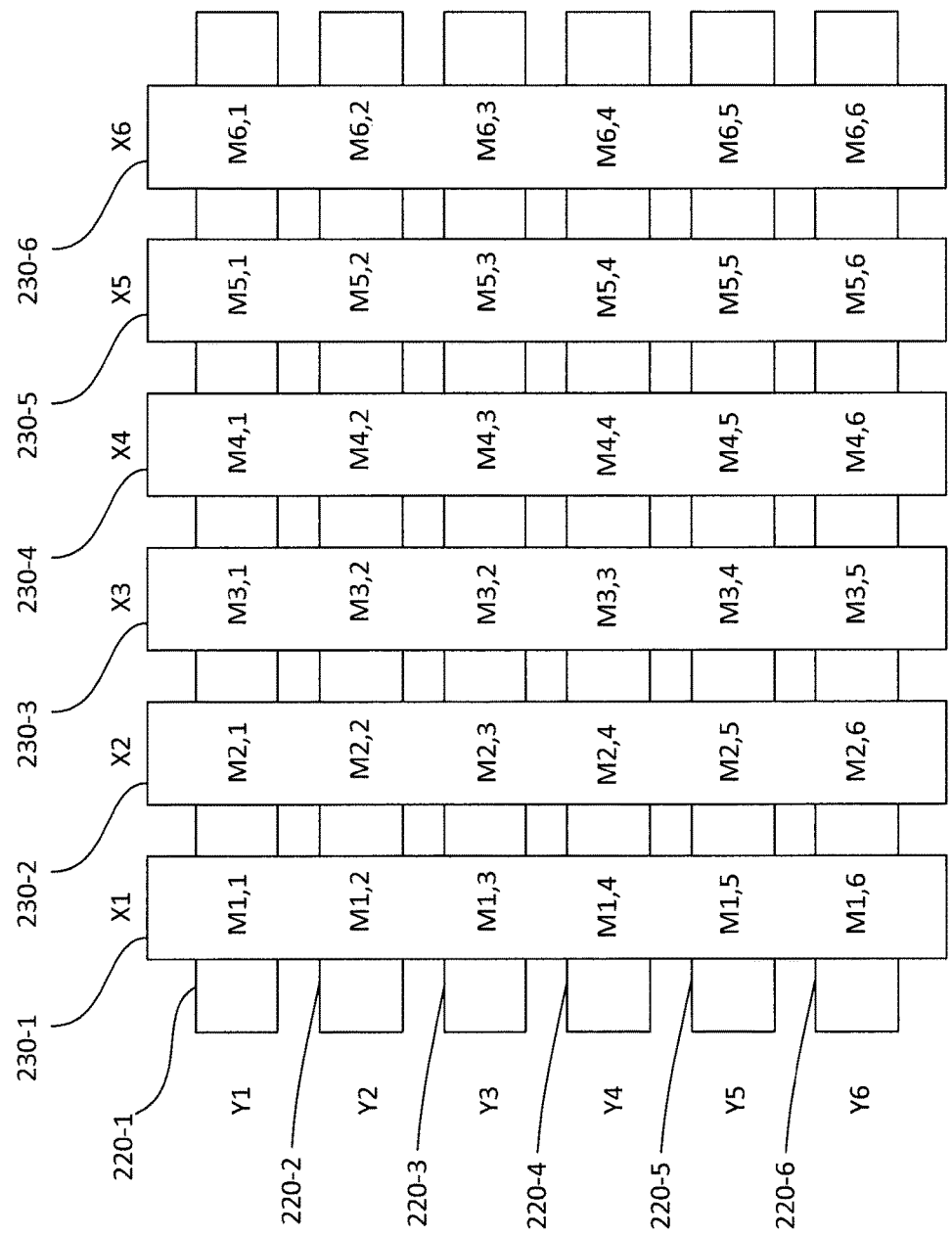
FIGS. 4A-4B are block diagrams depicting sensor electrodes for capacitive sensing, according to examples.

One type of sensing, profile sensing, is described with respect to FIG. 4A. Profile sensing involves driving horizontal and vertical sensor electrodes, such as sensor electrodes 220 and sensor electrodes 230, respectively, of FIG. 2A. This technique results in measurements from both the set of horizontal electrodes and the set of vertical electrodes. Measurements Y1-Y6 are measurements taken for horizontal sensor electrodes 220-1 and measurements X1-X6 are measurements taken for vertical sensor electrodes 230. With this technique, two signal profiles are generated—one for the horizontal electrodes and one for the vertical electrodes. More specifically, for the horizontal electrodes, each sensor electrode 220 has an associated measurement and each such measurement is plotted versus position to generate a signal profile. For example, processing system 110 would plot measurement Y1 at a position corresponding to the position of horizontal sensor electrode 220-1, would plot measurement Y2 at a position corresponding to the position of horizontal sensor electrode 220-2, and so on. Processing system generates a signal profile in a similar manner for the vertical sensor electrodes 230. Specifically, measurements for each vertical sensor electrode 230 are plotted versus position of the sensor electrode 230 to generate a signal profile. In many cases, as described above, profile sensing may be performed using absolute capacitive sensing. However, transcapacitive sensing may also be used in order to generate one dimensional signal profiles. In many embodiments, absolute capacitive sensing is a more efficient way to generate signal profiles 310, but transcapacitive sensing techniques may have other advantages including being more suited to detecting multiple input objects in the sensing region.

Because two signal profiles are generated in this manner, it is possible that two different height values would be obtained by performing the fitting and height value determination described above. Thus, in some embodiments, processing system 100 combines the two different height values to obtain a combined height value that is deemed to describe the height of the input object 140 that resulted in the measurements. In some embodiments, combining the height values comprises taking an arithmetic mean of the height values. In other embodiments combining the height values comprises taking a weighted mean, with the weights corresponding to each value of height dependent of the goodness of fit obtained in the fitting process (e.g., where a better fit corresponds to a larger weight).

In some embodiments, only horizontal sensor electrodes 220 or only vertical sensor electrodes 230 are used to generate a signal profile. In other words, processing system 100 uses measurements from one set of sensor electrodes to generate a signal profile and measurements for the other set of sensor electrodes are disregarded for the purposes of generating a signal profile.

Profile sensing generates two "one-dimensional" sets of sensing measurements. However, other types of sensing, now described, generate a two-dimensional set of sensing measurements. These other types of sensing include transcapacitive sensing using the vertical and horizontal sensing electrodes illustrated in FIGS. 2A and 4A, absolute capacitive sensing using the matrix pattern of sensing electrodes illustrated in FIGS. 2B and 4B, and transcapacitive sensing using the matrix pattern of sensing electrodes illustrated in FIGS. 2B and 4B.

Figure 4B:
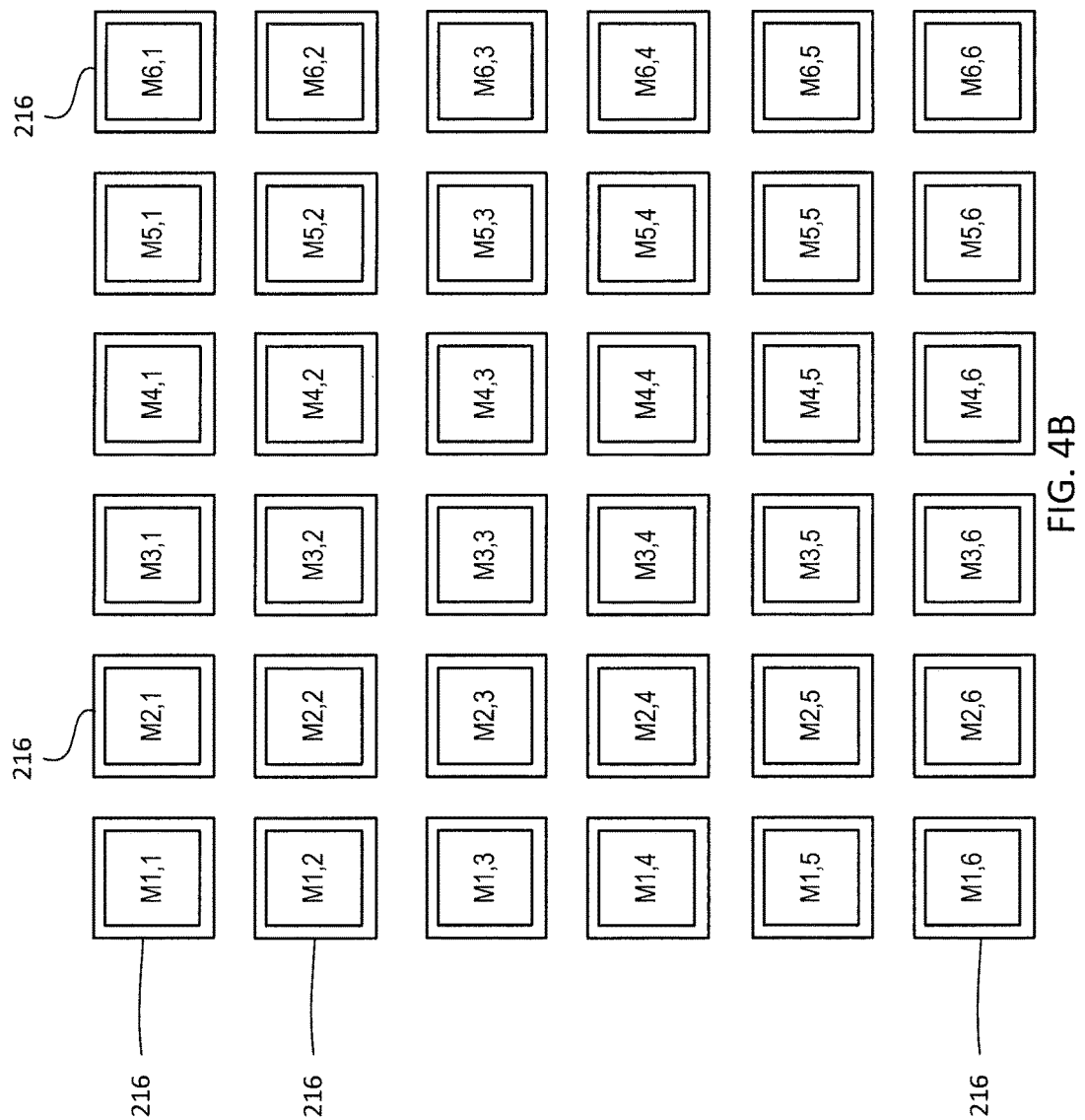

For each such type of capacitive sensing, processing system 110 generates a two-dimensional set of sensing measurements. For example, in FIG. 4A, transcapacitive sensing generates sensing measurements MX,Y, where X and Y represent the x- and y-position of the transmitter and receiver electrodes conducting transcapacitive sensing. In FIG. 4B, absolute sensing generates a similar two-dimensional set of measurements. For transcapacitive sensing with the matrix of sensor electrodes of FIGS. 2B and 4B, processing system 110 may also generate a two-dimensional set of measurements. In such a sensing scheme, multiple sensing patterns are possible. For example, processing system 110 can drive some sensor electrodes 216 for sensing as transmitter electrodes and can receive resulting signals with neighboring sensor electrodes 216 to generate measurements. In some embodiments, processing system 110 drives multiple sensor electrodes 216 together simultaneously as a single transmitter electrode, and can receive resulting signals with one, or multiple, sensor electrodes 216. This type of driving and receiving could be done at multiple locations to generate a two-dimensional set of measurements.

Because these techniques produce a two dimensional set of measurements, processing system 110 cannot, without additional or different processing, obtain a height as shown and described with respect to FIG. 3A. More specifically, the two dimensional set of measurements, without further processing, is not directly amenable to representation as shown in FIG. 3A.

Thus, to accommodate this two-dimensional data, processing system 110 either processes the two-dimensional set of measurements to generate one or more one-dimensional sets of data, or directly processes the two-dimensional data to determine height.

To process the two-dimensional set of measurements to generate one or more one-dimensional sets of data, processing system 110 may perform one of several different techniques. In one technique, processing system 110 simply chooses a single row or column of measurements (e.g., all measurements identified as M3,Y or MY,3) as the one-dimensional set of measurements to then process to determine height of the input object 140. In such a technique, processing system 110 may choose a row or column that has the highest average measurement values, may choose a particular pre-designated row or column, or may choose a particular row or column in another way.

In another technique, processing system 110 combines measurements for the vertical direction and the horizontal direction to generate one-dimensional sets of measurements for the horizontal and vertical direction. More specifically, according to this technique, for each row of the measurements, processing system 110 combines all measurements in that row to generate a single combined measurement corresponding to that row. Processing system 110 then assembles the combined measurements into a single one-dimensional set of measurements. Referring to FIG. 4A, in an example, processing system 110 combines the measurements M1,1, M2,1, . . . , M6,1 into a single combined measurement for row 1, combines the measurements M1,2, M2,2, . . . , M6,2 into another single combined measurement for row 2, and so on, for some or all rows. Processing system 110 may also combine measurements for all columns to generate another one-dimensional set of measurements for the columns (e.g., combine measurements M1,1, M1,2, . . . , M1,6 into a measurement for column 1, combine measurements M2,1, M2,2, . . . , M2,6 into another measurement for column 2, and so on, for some or all columns). For this technique, combination can be done by summing the measurements in the rows (or columns), averaging the measurements in the rows (or columns), or in other ways.

With the two-dimensional data simplified into one or two sets of one-dimensional data, the techniques for determining height by fitting a curve to the data, described above, can be performed on the data that is simplified into one or two sets of one-dimensional data.

For direct processing, processing system 110 would treat the two-dimensional data as a curved surface and perform curved surface fitting to an appropriate mathematical function. For example a two-directional Gaussian can be used:

$$P(x,y)=e^{(-(x^2+y^2)/2h^2)}$$

where x and y are the positions of the sensor electrodes from each of the sets, and h, the same as in previous examples, is the height of the input object.

Figure 5:
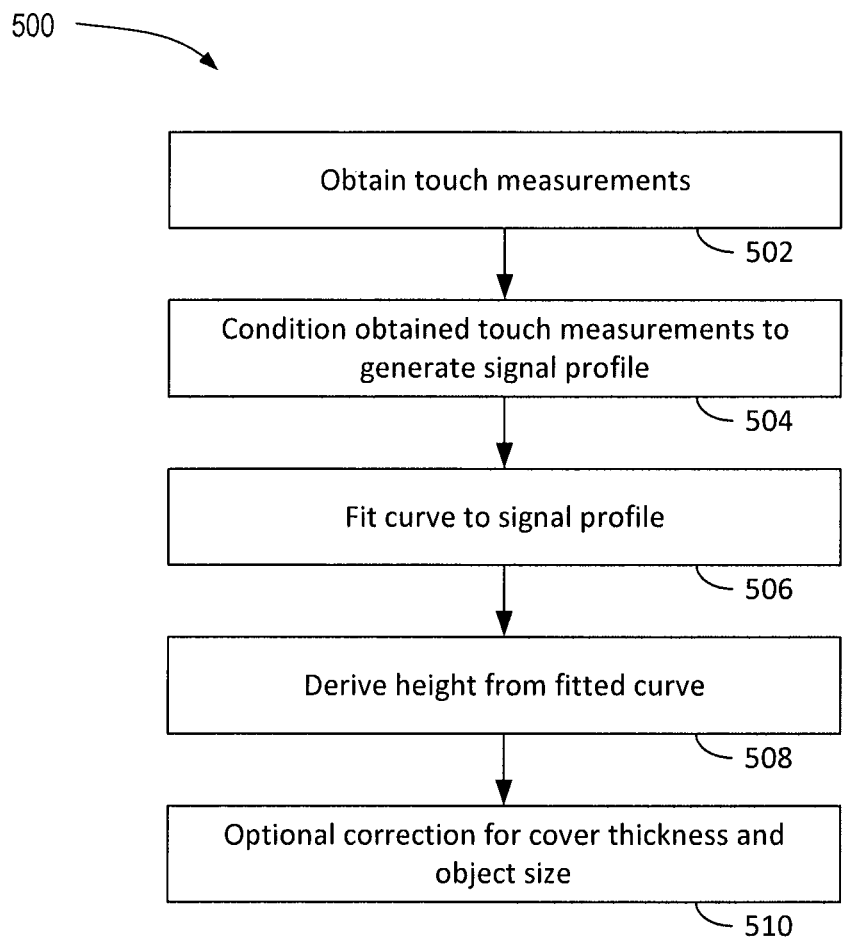
FIG. 5 is a flow diagram of a method for determining height of an input object based on measurements obtained from sensor electrodes, according to an example.

FIG. 5 is a flow diagram of a method 500 for determining height of an input object 140 based on measurements obtained from sensor electrodes, according to an example. Although described with respect to the system of FIGS. 1 and 2A-2B, those of skill in the art will recognize that any system, configured to perform method 500 in various technically feasible orders, falls within the scope of the present disclosure.

As shown, method 500 beings at step 502, where processing system 110 obtains touch measurements. Processing system 110 may be the processing system 110A of FIG. 2A, which drives perpendicularly crossing horizontal sensor electrodes 220 and vertical sensor electrodes 230. Processing system 110 may also be processing system 110B of FIG. 2B, which drives a matrix of sensor electrodes 210. Further, processing system 110 may use transcapacitive sensing or absolute capacitive sensing. With transcapacitive sensing, processing system 110 drives one or more sensor electrodes with signals and receives resulting signals with one or more other sensor electrodes, the resulting signals including components associated with presence of an input object 140. With absolute capacitive sensing, processing system 110 drives a signal onto one or more sensor electrodes and senses changes to capacitance of the driven sensor electrodes, those changes to capacitance being indicative of the presence of an input object 140.

At step 504, processing system 110 conditions the obtained touch measurements to generate a signal profile. Conditioning the touch measurements includes converting the touch measurements into a signal profile from which a height parameter can be derived. For profile sensing, as described above, measurements from one "direction" of sensor electrodes (e.g., rows or columns) can be used to construct the signal profile, or measurements from both "directions" of sensor electrodes (e.g., rows and columns) can be combined and used to construct two signal profiles, from which two different height values are determined and then averaged together.

For sensing techniques that generate two-dimensional sets of data, conditioning the touch measurements may include either converting the two-dimensional set of data to one or more one-dimensional sets of data, or leaving the two-dimensional set of data so that a two-dimensional curved surface fitting may be performed in step 506. Converting a two-dimensional set of data to one or more one-dimensional sets of data may be performed by selecting a particular row and/or column to be used as the one or more one-dimensional sets of data. Converting a two-dimensional set of data to one or more one-dimensional sets of data may alternatively be performed by combining measurements from one or both directions (e.g., horizontal or vertical) to obtain a one-dimensional set of data each such direction. As described above, combining in this manner may be accomplished by summing the measurements of each row or column, averaging the measurements of each row or column, or in other ways. In some embodiments, processing system 110 does not condition two-dimensional sets of data to generate one or more one-dimensional sets of data, and instead leaves the two-dimensional set of data in two-dimensional form for fitting to a curved surface instead of a curved line.

In any of the above conditioning techniques, the result of data conditioning is deemed to be a "signal profile." Thus, the signal profile may include one or two one-dimensional sets of data or may include a two-dimensional set of data.

At step 506, processing system 110 fits a curve to the signal profile. If the signal profile includes one or more one-dimensional sets of data, processing system 110 fits the curve generated based on one of the three mathematical functions (ArtTan, Cauchy, or Gaussian) described above to the one or more one-dimensional sets of data. Note that a function other than one of the three mathematical functions described may alternatively be used. Fitting can be achieved by varying the height parameter in the mathematical functions until a least squares comparison between the data of a one-dimensional set of data is below a threshold or may be done via direct computation. For the two-dimensional set of data, fitting can be accomplished by fitting the two-dimensional set of data to a mathematical function described above $(P(x,y)=e^{(-(x^2+y^2)/2h^2)})$.

At step 508, processing system 110 derives the estimated height from the fitted curve. More specifically, fitting the curve produces a version of the mathematical function described above with a particular chosen height parameter. This height parameter is deemed to be the estimated height.

At step 510, in some embodiments, processing system 110 performs correction for cover thickness and/or object size. Specifically, processing system 110 subtracts the thickness of the cover that is laid over the sensor electrodes from the estimated height in order to obtain a corrected height. Processing system 110 may also modify the height based on the size of the input object 140, if that size is known. Because a larger object produces a "fatter" profile (which is associated with a greater height), processing system 110 may adjust the determined height to compensate for input objects of varying size. In some example embodiments, 1 mm is subtracted from height for an active pen and 10 mm is subtracted from height for a finger. In some embodiments, the correction for input object size may remain constant regardless of input object height. In other embodiments, the correction for input object size may vary based on the height of the input object. For example, the correction for input object size may be greater when the input object 140 is closer to the input device 100 than when the input object is farther away from the input device 100.

Processing system 110 can use the corrected height information to perform various operations. In some embodiments, processing system 110 changes operating mode based on height. More specifically, in some embodiments, processing system 110 reduces the report rate when height is above a certain threshold, because the determined position of an input object may be imprecise when an object is hovering at a great distance. In some embodiments, processing system 110 increases the amount of filtering when height is above a threshold, because, again, the determined position of an input object may be imprecise in such situations. In some embodiments, when height is above a certain threshold, processing system 110 does not report or calculate position of that input object 140 but only that a hovering input object 140 is detected. In some embodiments, processing system 110 may disable detection and/or reporting of input objects that are "hovering" (i.e., above a particular threshold height). This technique may be useful to help prevent reporting of a portion of a hand (which would appear to be hovering) when a finger is touching the input device 100.

In some embodiments, processing system 110 uses two separate scan types and/or two separate algorithms to determine position for an input object 140 when the input object 140 is hovering versus when the input object 140 is touching the input device 100. Because these different algorithms may produce different values, processing system 110 may determine position using both an algorithm for when a touching input object 140 and a hovering input object and average the determined positions.

In some embodiments, processing system 110 uses the corrected height information to predict a user action such as when the input object 140 will touch the input device 100. Specifically, processing system 110 may calculate a trajectory of the input object 140 based on previously calculated height values for the input object 140 and, based on the previously calculated height values, extrapolate into the future to determine a future point in time when the input object 140 will touch the input device 100. Further, processing system 110 may utilize this predicted "touch down time" to minimize first touch latency. First touch latency refers to latency between actual touch down time and the time the touch position is first reported. Because scans are conducted periodically (e.g., every 10 ms), the time of actual touch down may not align with a sensing scan causing an undesirable lag of a sensing scan. Utilizing a predicted touch down time, processing system 110 can align the time with which a sensing scan is conducted immediately after the predicted touch down time.

In some embodiments, a host device coupled to the processing system 110 and receives height information from the processing system 110. The host device may include an operating system that controls the manner in which content is displayed for a user. In some embodiments, the operating system may zoom in and out on content based on the height information received from the processing system 110. For example, as the input object 140 gets closer to the input device 100, the operating system may zoom in to the content and as the input object 140 gets farther from the input device 100, the operating system may zoom out from the content. In some embodiments, the processing system 110 reports the estimated touch down time (as well as estimated position) of an input object 140 to the operating system and the operating system uses the estimated touch down time to pre-load an application or other content (such as a web page) that is predicted to be accessed by a user.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for capacitive sensing, the processing system comprising:
 a sensor processor, configured to acquire changes of capacitance in a sensing region associated with a plurality of sensor electrodes in a capacitive sensor, wherein at least some of the changes of capacitance are due to an input object being present in the sensing region; and
 a data processor configured to:
  determine a signal profile comprising a two-dimensional set of positional measurements corresponding to the changes of capacitance,
  determine a fit value of a fitting parameter of a mathematical function representing a curved surface that fits the mathematical function to the signal profile,
  wherein the fitting of the mathematical function to the signal profile exceeding a quality threshold, wherein the fitting parameter correlates to hover height of an input object and adjusting the fitting parameter affects the fit of the mathematical function to the signal profile, and
  calculate a hover height based on the fit value of the fitted mathematical function, and
  output the hover height.

2. The processing system of claim 1, wherein the signal profile includes two signal profiles describing the amplitude of the changes of capacitance of the plurality of sensor electrodes along two orthogonal axes.

3. The processing system of claim 1, wherein the mathematical function is an arctangent estimate of hover height based on sensor electrode area and projected distance of the input object to the sensor electrode.

4. The processing system of claim 1, wherein the mathematical function is a Cauchy estimate of hover height based on sensor electrode area and projected distance of the input object to the sensor electrode.

5. The processing system of claim 1, wherein the mathematical function is a Gausian estimate of hover height based on sensor electrode area and projected distance of the input object to the sensor electrode.

6. The processing system of claim 1, wherein the data processor is further configured to:
 adjust the hover height based on an estimated size of the input object.

7. The processing system of claim 1, wherein the data processor is configured to change an operating mode based on the calculated hover height.

8. The processing system of claim 1, wherein the data processor is further configured to determine a predicted action of the input object based on the calculated hover height and based on one or more previously calculated hover heights.

9. The processing system of claim 1, wherein the data processor is further configured to:
 adjust the hover height based on a cover glass thickness in the sensing region.

10. A method for capacitive sensing, the method comprising:
 acquiring changes of capacitance in a sensing region associated with a plurality of sensor electrodes in a capacitive sensor, wherein at least some of the changes of capacitance are due to an input object being present in the sensing region;
 determining a signal profile comprising a two-dimensional set of positional measurements corresponding to the changes of capacitance;

determining a fit value of a fitting parameter of a mathematical function representing a curved surface that fits the mathematical function to the signal profile, wherein the fitting of the mathematical function to the signal profile exceeding a quality threshold, wherein the fitting parameter correlates to hover height of an input object and adjusting the fitting parameter affects the fit of the mathematical function to the signal profile, calculating a hover height based on the fit value of the fitted mathematical function, and outputting the hover height.

11. The method of claim 10, wherein the signal profile includes two signal profiles describing the amplitude of the changes of capacitance of the plurality of sensor electrodes along two orthogonal axes.

12. The method of claim 10, wherein the mathematical function is an arctangent estimate of hover height based on sensor electrode area and projected distance of the input object to the sensor electrode.

13. The method of claim 10, wherein the mathematical function is a Cauchy estimate of hover height based on sensor electrode area and projected distance of the input object to the sensor electrode.

14. The method of claim 10, wherein the mathematical function is a Gausian estimate of hover height based on sensor electrode area and projected distance of the input object to the sensor electrode.

15. The method of claim 10, further comprising adjusting the hover height based on an estimated size of the input object.

16. The method of claim 10, further comprising changing an operating mode based on the calculated hover height.

17. The method of claim 10, further comprising determining a predicted action of the input object based on the calculated hover height and based on one or more previously calculated hover heights.

18. The method of claim 10, further comprising:
adjusting the hover height based on a cover glass thickness in the sensing region.

19. An input device, comprising:
a plurality of sensor electrodes within a sensing region; and
a processing system, configured to:
acquire changes of capacitance in the sensing region, wherein at least some of the changes of capacitance are due to an input object being present in the sensing region,
determine a signal profile comprising a two-dimensional set of positional measurements corresponding to the changes of capacitance;
determine a fit value of a fitting parameter of a mathematical function representing a curved surface that fits the mathematical function to the signal profile,
wherein the fitting of the mathematical function to the signal profile exceeding a quality threshold, wherein the fitting parameter correlates to hover height of an input object and adjusting the fitting parameter affects the fit of the mathematical function to the signal profile,
calculate a hover height based on the fit value of the fitted mathematical function, and
output the hover height.

20. The input device of claim 19, wherein the signal profile includes two signal profiles describing the amplitude of the changes of capacitance of the plurality of sensor electrodes along two orthogonal axes.

* * * * *